Patented Nov. 15, 1938

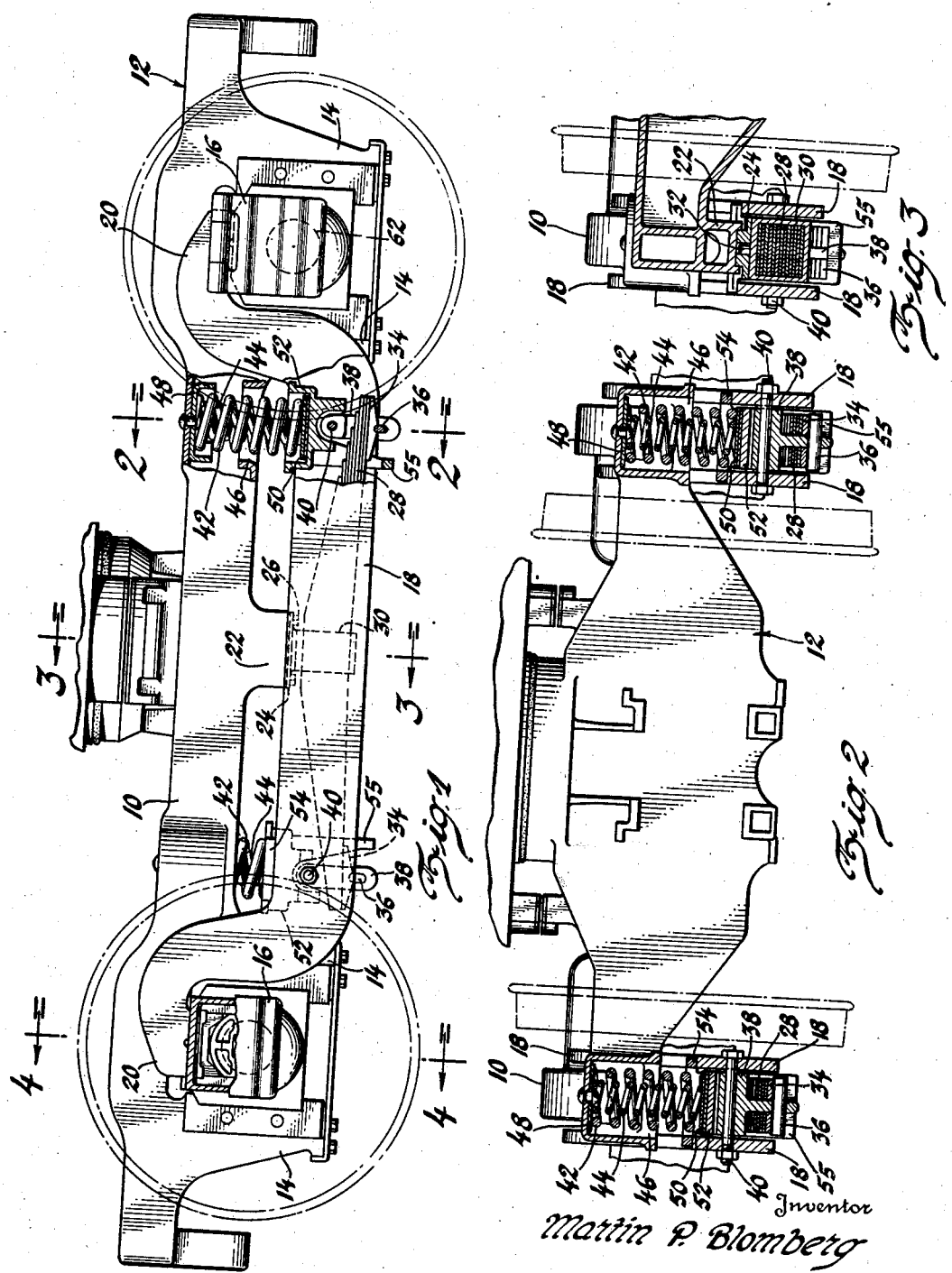

2,137,074

UNITED STATES PATENT OFFICE 2,137,074

RAILWAY CAR TRUCK

Martin P. Blomberg, Hinsdale, Ill., assignor to General Motors Corporation, Detroit, Mich., a corporation of Delaware Application July 6, 1937, Serial No. 152,061

2 Claims. (Cl. 105—194)

This invention relates to the construction of trucks intended for use on railway vehicles such as locomotives of the electric or Diesel-electric type, and freight cars or similar vehicles, and has to do particularly with the type of spring suspensions employed in such trucks.

When railway vehicles are designed for use in passenger service, it is considered so essential that the best possible riding qualities be provided that elaborate and expensive types of spring suspensions employing combinations of different types of springs are used, but when such vehicles are built for use principally for switching, hauling freight or similar purposes, while it still is desirable from the standpoint of the comfort of the operators and the protection of equipment or lading to have the vehicle possess good riding characteristics, it is generally considered that the limitations as to weight and cost of the vehicle preclude the use of the complicated types of spring suspensions employed on vehicles intended for use in passenger service.

Therefore, the form of spring suspension most commonly provided on railway vehicles intended for switching or freight hauling purposes utilizes leaf springs, but these are not entirely satisfactory because when made large enough to support the relatively heavy loads imposed upon them, they are not resilient enough to respond to light shocks and vibrations and consequently vehicles so equipped do not possess good riding characteristics.

Coil springs have been employed to overcome this objection, but they are unsatisfactory for the reason that they have a tendency to strike a natural period of vibration at some speed or under some operating condition of the vehicle, with the result that a vibration of whole vehicle is set up, and under certain conditions this vibration builds up to a point where it not only becomes very objectionable and uncomfortable to the operators but is also destructive to the equipment or lading carried by the vehicle.

I have therefore devised a truck construction wherein both leaf and coil springs are used, being combined in a novel manner which produces an arrangement which gives the vehicle excellent riding qualities, but which is at the same time very simple in construction, light in weight and economical to produce. In combination with this particularly satisfactory arrangement of springs, I employ a resilient means for cushioning or absorbing the shocks caused by lateral movement of the axles, and I have found that this combination produces a truck which has riding qualities which are far superior to those possessed by the ordinary switching locomotive or freight car, and which compares very favorably with those of vehicles employed in passenger service.

My invention will be better understood by referring to the accompanying drawing and the following description, in which Fig. 1 is a side elevation of a railway vehicle truck embodying my invention.

Fig. 2 is a transverse sectional view taken on the line 2—2 of Fig. 1.

Fig. 3 is a fragmentary sectional view taken on the line 3—3 of Fig. 1.

The reference numeral 10 indicates the side frame member of a railway vehicle truck 12 between the pedestals 14 of which the journal boxes 16 are received in the usual manner. On each side of the truck is a pair of equalizer bars 18 which are spaced apart as shown in Figs. 2 and 3, their ends 20 resting on top of the journal boxes, and their central portions being depressed so that they lie beneath the side frame member, as shown in Fig. 1.

The truck frame is supported on the equalizer bars by the following described arrangement of springs. Extending downwardly from the central portion of the side frame member is a projection 22 which serves as a spring pad, and a spring block 24 is secured to this spring pad by bolts 26. A multiple leaf spring 28 has a clip 30 secured around its central portion, and this clip bears against the under surface of the block 24, a dowel 32 on the clip fitting within an opening formed in the block to correctly locate the spring relative to the pad 22.

It will be noted that the spring 28 lies between the pair of equalizer bars 18, each end thereof resting on top of a bearing member 34, which in turn rests on a key 36 which extends through the lower portion of a spring shackle 38, the upper end of the latter having a passageway formed therethrough, and a bolt 40 extends through this passageway and through openings formed in the equalizer bars to support the shackle from the equalizer bars.

While the above described spring structure would, if made heavy enough, yieldingly support the truck frame on the equalizer bars, it would not be sensitive enough to respond to light shocks or vibrations, and consequently would not produce good riding characteristics, so I provide an additional spring structure at each end of the leaf spring, which structure consists of inner and outer coil springs 42 and 44 which extend through openings 46 formed in the bottom wall of the side frame member 10, the upper ends of these springs being received within a cup 48 which is secured to the lower surface of the top wall of the side frame member. The lower ends of the coil springs bear against liners 50 which are carried in a spring seat 52, which fits between the pair of equalizer bars and is supported thereon by means of a flange 54 which rests on top of the upper edges of the equalizer bars, as best shown in Fig. 2. While I have shown the use of inner and outer coil springs, it will be obvious that only a single coil spring may be employed if desired. 55 is a loop shaped portion formed on the spring seat 52, which portion extends under the leaf spring 28, being normally out of contact with the leaf spring but serving as a safety device to support it if the shackle 38 should break.

It will be seen that while the coil springs are in line with and directly above the leaf spring shackle 38, the coil springs are not connected to the leaf spring, both types of springs being connected directly to the equalizer bars so that they operate in parallel and independently of each other, each type supporting a predetermined proportion of the weight. I have found that the best riding qualities are obtained when the springs are so proportioned in size relative to each other that the leaf spring supports approximately 30% of the weight and each of the sets of coil springs at the ends supports approximately 35% of the weight. To compensate for manufacturing variations and to insure that each type of spring supports the desired proportion of the weight, adjustments may be made at assembly by placing more or less of the liners 50 between the lower ends of the coil springs 42, 44 and the spring seat 52, or by inserting or removing shims between the leaf spring block 24 and the pad 22.

The coil and leaf springs are further so designed that their natural periods of vibration will be different from each other and of such orders that there will be no possibility of their becoming synchronized with each other within the range of speed within which the vehicle is intended to be operated.

I have found the above described arrangement of springs to produce excellent riding characteristics, and believe this is due to the combination of the two types of springs operating in parallel and being so proportioned with respect to each other that the light shocks or vibrations are absorbed by the coil springs, the heavier shocks being taken by the leaf springs, the latter also serving somewhat as shock absorbers to dampen the oscillations of the coil springs because of the energy which is absorbed by the action of the spring leaves rubbing against each other.

While from the standpoint of the spring structure, the riding characteristics of the truck are very satisfactory, since the truck disclosed is of the so-called "rigid" type, not having any swing hangers, when the vehicle it is used upon is operated at high speed as it very often is intended to be, the tendency of the wheels and axles to move laterally with respect to the journal boxes would impose severe shocks upon the latter if some means were not provided to prevent this, and consequently would impair to some extent the good riding characteristics which are obtained by the above described arrangement of springs. I have therefore found it desirable to employ in connection with the above described spring structure a lateral motion device of the type disclosed in my pending application S. N. 102,854, filed Sept. 28, 1936, for the purpose of absorbing or cushioning the shocks caused by the lateral motion of the axles.

Comparative tests have shown that the combination of the spring arrangement described with the means for cushioning the shocks caused by the lateral movement of the axles produces a truck which imparts excellent riding qualities to the vehicle it is used upon, but which it will be seen is simple in construction, is of light weight and which costs little if any more to produce than the hard riding truck constructions it is intended to replace.

While I have shown and described a specific embodiment of my invention, it will be understood that various changes in the details of construction and arrangement may be made without departing from the spirit and scope of the appended claims.

I claim:

1. In a truck, the combination of a hollow side frame member having upper and lower horizontally extending walls, the lower wall having a plurality of openings formed therethrough, a supporting member, a leaf spring having its central portion connected to the lower wall of the side frame member and its ends connected to the supporting member, and a plurality of coil springs extending through the openings in the lower wall of the side frame member so that the upper ends of the coil springs bear against the under surface of the top wall of the side frame member and the lower ends of the coil springs bear upon the supporting member.

2. In a truck, the combination of a hollow side frame member having upper and lower horizontally extending walls, the lower wall having a pair of openings formed therethrough, a pair of spaced apart supporting members extending beneath the side frame member, a leaf spring having its central portion connected to the lower wall of the side frame member and its ends connected to the supporting members, spring seats straddling the supporting members over each end of the leaf spring, and coil springs extending through the openings in the lower wall of the side frame member so that the upper ends of the coil springs bear against the under surface of the top wall of the side frame member and the lower ends of the coil springs are received in the spring seats carried upon the supporting members.

MARTIN P. BLOMBERG.